UNITED STATES PATENT OFFICE.

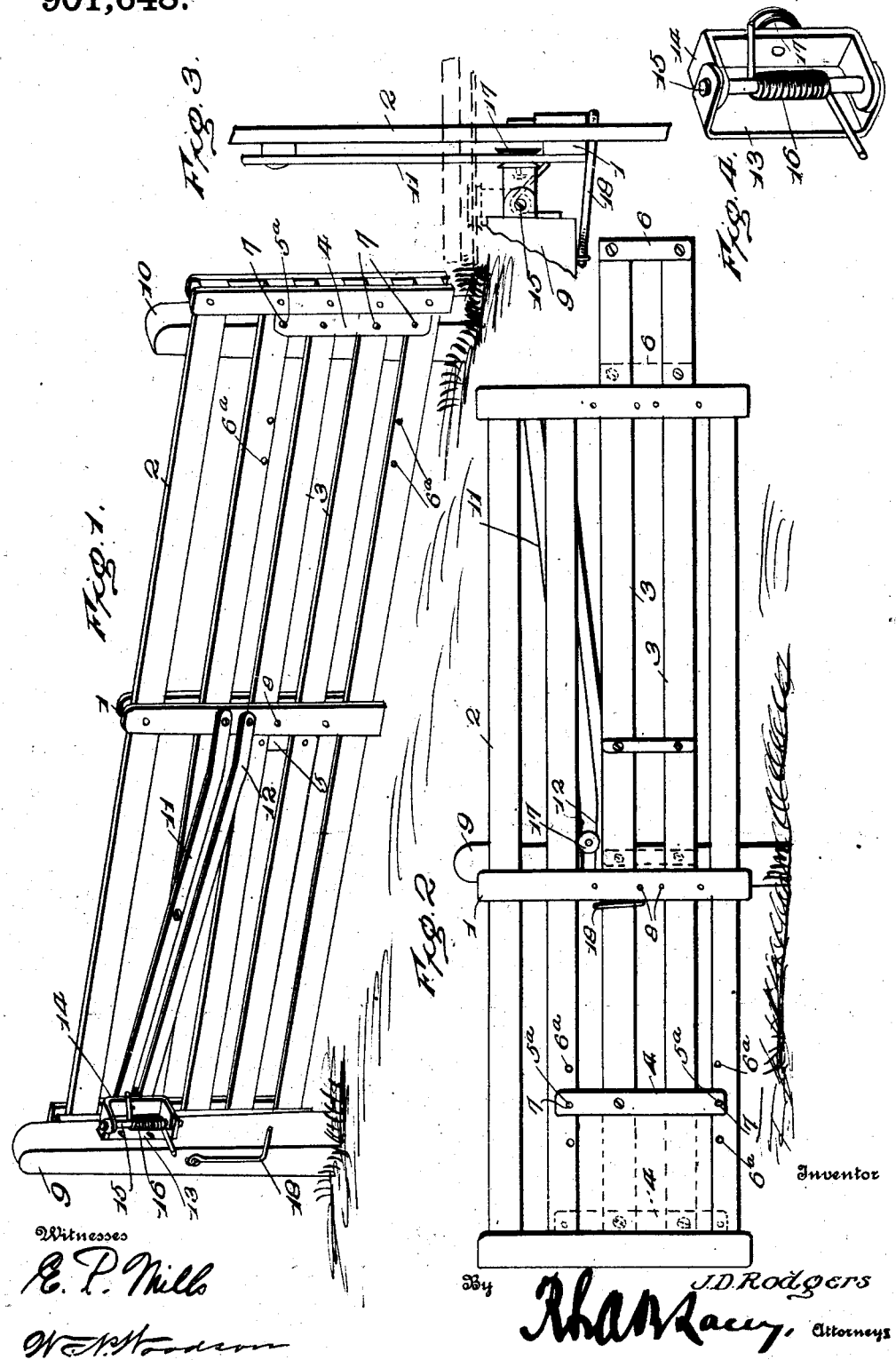

JAMES D. RODGERS, OF GEORGETOWN, KENTUCKY.

FARM-GATE.

No. 901,648.        Specification of Letters Patent.        Patented Oct. 20, 1908.

Application filed January 24, 1908. Serial No. 412,491.

*To all whom it may concern:*

Be it known that I, JAMES D. RODGERS, a citizen of the United States, residing at Georgetown, in the county of Scott and State of Kentucky, have invented certain new and useful Improvements in Farm-Gates, of which the following is a specification.

The present invention provides a gate of novel formation and mounted in a peculiar manner so as to allow of a maximum amount of opening in a fence or inclosure so that large sized agricultural machinery may readily pass into and from said inclosure without requiring folding or dismantling of the parts or the enlargement of the usual gate opening.

A further purpose of the invention is the provision of a gate which may be used for separating stock, the gate being provided with a sliding section admitting of an opening of desired size being formed in the gate through which the stock may pass.

For a full description of the invention and the merits thereof; that is to acquire a knowledge of the details of construction and the means for effecting the result, reference is to be had to the following description and accompanying drawings.

While the invention may be adapted to different forms and conditions by changes in the structure and minor details without departing from the spirit or essential features thereof, the preferred embodiment is shown in the accompanying drawings, in which:

Figure 1 is a perspective view of a farm gate embodying the invention. Fig. 2 is a front view of the gate, the full lines showing the movable section adjusted to provide an opening in the gate for separating stock. Fig. 3 is a top plan view of a portion of the gate and the post to which the same is connected, the full lines showing the position of the gate when closed and the dotted lines the position of the gate when opened. Fig. 4 is a detail perspective view of the gate mountings.

Corresponding parts are referred to in the following description and indicated in all the views of the drawings by the same reference characters.

The gate is composed of vertical strips 1 and rails 2, the latter being spaced and secured between companion strips 1. The gate is provided near its bottom with a movable section consisting of spaced rails 3 and connecting strips 4, 5 and 6. The connecting strip 6 forms a tie for the projecting ends of the rails 3 which extend beyond the adjacent end of the gate. The connecting strips 4 project above and below the rails 3 of the movable section and embrace opposite sides of the adjacent rails 2 bordering upon the open closed by said movable section. Openings 5ª are provided in the ends of the connecting strips 4 and are adapted to register with openings 6ª in the rails 2 bordering upon the space closed by the movable gate section, said openings being adapted to receive pins 7 for holding the movable section in the desired position. Pins 8 connect the vertical strips 1 of the gate and serve to direct the movable section in its adjustments, and also to hold the same in proper position.

Posts 9 and 10 are located at opposite sides of the gate opening. The gate is mounted upon the post 9 and closes against the post 10 and opens and closes by a combined sliding and swinging movement. Guides 11 are provided upon one side of the gate and extend approximately one-half the length thereof, being located at one end. The guides 11 incline to the horizontal and are relatively higher at the outer end, so that upon sliding the gate preliminary to swinging the same open, the gate rises, thereby enabling the same to clear snow, ice or any other obstruction that would tend ordinarily to prevent the free opening of the gate. The inner end of the guides 11 has a horizontal portion 12 upon which the gate balances, thereby enabling the same to be readily swung open or shut. The guides 11 may be wood or metal bars, the inner ends being bent to provide the horizontal portions 12 and the inclined position of said guides adapts them to brace or strengthen the gate.

The mounting for the gate consists of two brackets 13 and 14 of similar formation and pivotally connected by means of a pin 15 passed through openings in the overlapped bent ends of said brackets. A coil spring 16 is mounted upon the pivot pin 15 and its end portions project and engage with the brackets 13 and 14, said spring serving to hold them normally at right angles to each other. The mounting is applied to a side of the post 9 preferably to the side facing the gate opening. A wheel 17 is fitted to the bracket 14 and coöperates with the guides 11 to support the gate. When the parts are assembled, the wheel 17 occupies a position approximately at one corner of the post 9, and in such position as to admit of the gate's sliding or rolling upon the wheel 17 preliminary to swinging the same open. The guides 11 embrace the wheel 17, so as to prevent the disengagement of the gate from the post 9. When the gate is swung open, it is secured by means of a hook 18 which is attached at one end to the post 9.

When it is required to separate stock, the movable section of the gate is slipped endwise, as indicated by the full lines in Fig. 2, so as to provide an opening of the required size for the stock to pass through.

The gate is opened by sliding the same towards the post 9, the guides 11 moving upon the wheel 17, and when the horizontal portion 12 of the guides reaches the wheel 17 the gate is balanced upon said wheel at a central point and may be readily swung open and secured by the fastening 18. To close the gate the fastening 18 is disengaged therefrom and the gate moved a one-quarter turn to the plane of the post 9 and 10, after which the gate is moved towards the post 10 and secured in any convenient way.

Having thus described the invention, what is claimed as new is:

In combination with a post, and a gate mounted both to move longitudinally and to swing about a vertical axis, a mounting for said gate comprising similar brackets pivotally connected, one of said brackets being attached to the post, a wheel fitted to the other bracket and receiving the gate, and a spring acting upon the two brackets to normally hold the gate closed.

In testimony whereof I affix my signature in presence of two witnesses.

JAMES D. RODGERS. [L. S.]

Witnesses:
V. B. HILLYARD,
W. N. WOODSON